UNITED STATES PATENT OFFICE.

CARL DUISBERG, OF ELBERFELD, GERMANY, ASSIGNOR TO THE FARBEN-FABRIKEN, VORMALS FR. BAYER & CO., OF SAME PLACE.

BLUE TETRAZO DYE.

SPECIFICATION forming part of Letters Patent No. 499,216, dated June 13, 1893.

Application filed January 19, 1893. Serial No. 458,947. (Specimens.) Patented in Germany August 4, 1889, No. 51,497; in France August 7, 1889, No. 200,091; in Italy August 30, 1889, Nos. 26,135 and 297, and in Austria-Hungary August 16, 1890, No. 9,507 and No. 23,156.

*To all whom it may concern:*

Be it known that I, CARL DUISBERG, chemist, doctor of philosophy, (assignor to the FARBENFABRIKEN, VORMALS FR. BAYER & CO., of Elberfeld,) a subject of the Emperor of Germany, residing at Elberfeld, Germany, have invented a new and useful Improvement in the Manufacture of Direct-Dyeing Coloring-Matters, (for which the aforesaid FARBENFABRIKEN has already obtained Letters Patent in the following countries: Germany, No. 51,497, dated August 4, 1889; France, No. 200,091, dated August 7, 1889; Austria-Hungary, No. 9,507 and No. 23,156, dated August 16, 1890, and Italy, Nos. 26,135 and 297, dated August 30, 1889,) of which the following is a specification.

My invention relates to the production of a new blue coloring-matter suitable for dyeing cotton, wool and silk by combining one molecular proportion of a tetrazo salt of diamidodiphenylsulphone disulpho acid (benzidine sulphone disulpho acid) with two molecular proportions of monoethylbetanaphthylamin.

In carrying out my process practically I proceed as follows: A watery solution of 4.5 kilos, by weight, of the sodium salt of diamidodiphenylsulphone disulpho acid (benzidine sulphone disulpho acid) is acidulated by means of muriatic acid and, after cooling by ice, a solution in water of 1.4 kilos, by weight, of sodium nitrite is added, taking care that the liquid remains moderately acid during the whole operation. After standing for several hours the formed tetrazo compound is filtered off and under continuous stirring added to a solution of 3.42 kilos, by weight, of monoethylbetanaphthylamine and 0.35 kilos, by weight, of sodium acetate in about 35 kilos, by weight, of glacial acetic acid. The combination begins immediately and is finished by heating for some time at about 50° centigrade. By adding water to the acetic acid solution the dye-stuff acid is precipitated. The latter is filtered off and treated with a diluted solution of sodium carbonate. In this manner the complete dye-stuff is formed which is insoluble in cold water and can be isolated by filtering off, pressing and drying.

My new dye-stuff thus produced possesses the following composition:

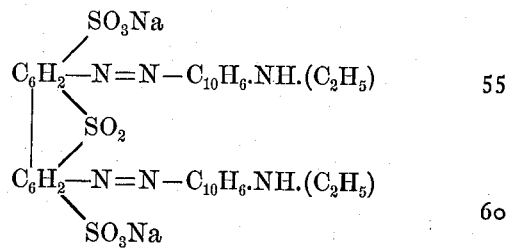

It forms in a dried and pulverized state a bluish-black powder soluble in water, especially in hot water, with reddish-blue color. It is also soluble in alcohol with the same blue color. In ammonia it dissolves with blue color, while in sodium carbonate it is little soluble at ordinary temperature and on heating with violet color. In soda-lye it is almost insoluble at ordinary temperature, and it dissolves on heating also sparingly with violet color. It is almost insoluble in diluted hydrochloric and sulfuric acid even on heating. When its solutions in water are mixed with ammonia or sodium carbonate, the color is not changed, while an addition of soda-lye in excess causes a precipitation of blue flakes. On adding diluted hydrochloric or sulfuric acid to its solutions in water, the color becomes at first dull blue, then bluish-black flakes are separated. It is dissolved by concentrated sulfuric acid with bluish-red color which is not altered by an addition of a small quantity of ice water, while an excess of water causes the separation of a bluish-red precipitate out of the sulfuric acid solution. It produces on unmordanted cotton and other vegetable fibers reddish-blue shades of a great fastness against the action of soaps and alkalies and yields similar shades on wool and silk. It differs by a greater solubility in water, by its composition and dyeing properties from that product which I have described in my Letters Patent No. 432,989, dated July 29, 1890, which is obtained by the action of tetrazo diphenyl sulphone disulpho acid upon phenylbetanaphthylamine and which yields indigo-blue shades and corresponds to the following formula:

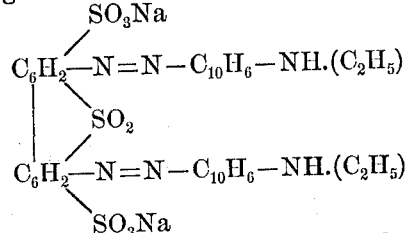

Having thus described my invention and in what manner it can be performed, that which I claim as new, and desire to secure by Letters Patent, is—

1. The process for producing a new tetrazo dye-stuff by combining one molecular proportion of a tetrazo salt of benzidine sulphone disulpho acid with two molecular proportions of monoethylbetanaphthylamine.

2. As a new product the tetrazo dye-stuff having the formula:

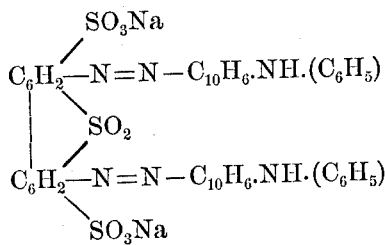

forming a bluish-black powder, soluble in water, especially on heating, soluble in alcohol with reddish-blue and ammonia with blue color, little soluble, even on heating, in sodium carbonate, with violet color, almost insoluble in soda-lye at ordinary temperature, and sparingly on heating, with violet color, almost insoluble, even on heating, in dilute hydrochloric and sulphuric acid, soluble in concentrated sulphuric acid with bluish-red color, which does not change on addition of a small quantity of ice water, but which separates a bluish-red precipitate on addition of an excess of water; dyeing unmordanted cotton, wool or silk reddish-blue, and having the qualities substantially as specified.

In testimony whereof I have signed my name in presence of two subscribing witnesses.

CARL DUISBERG.

Witnesses:
WM. ESSENWEIN,
RUDOLPH FRICKE.